No. 777,781. PATENTED DEC. 20, 1904.
A. FLEEGER.
METER.
APPLICATION FILED NOV. 1, 1902.
NO MODEL.
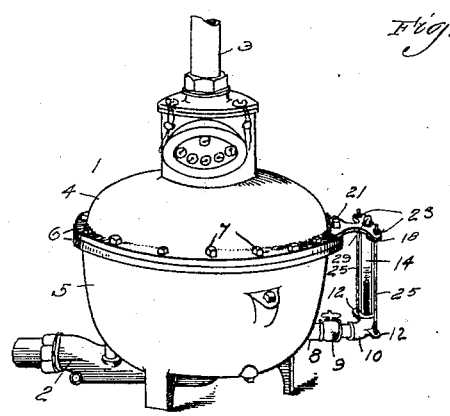
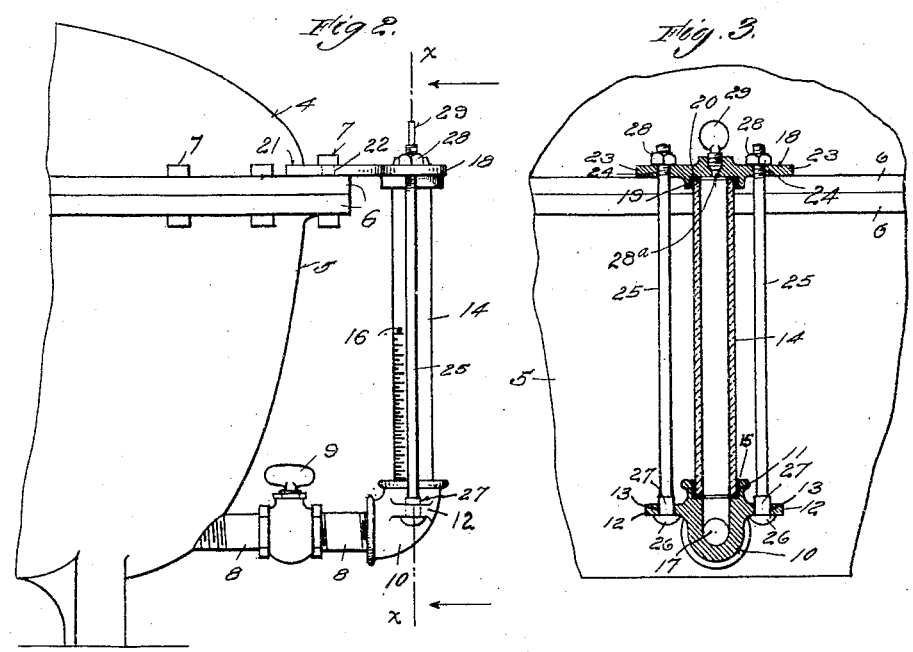
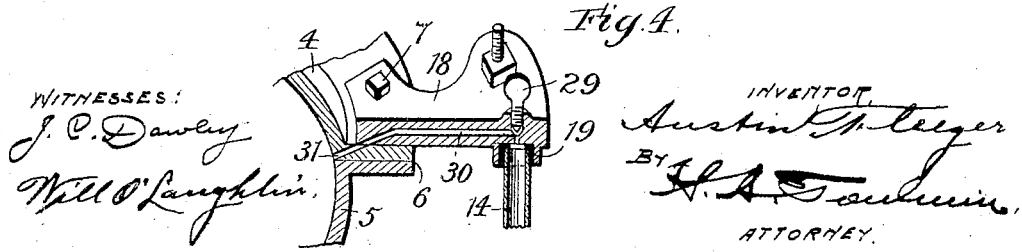
WITNESSES:
J. C. Dawley
Will O'Laughlin
INVENTOR
Austin Fleeger
BY
H. A. Toulmin
ATTORNEY.

No. 777,781. Patented December 20, 1904.

UNITED STATES PATENT OFFICE.

AUSTIN FLEEGER, OF CHICORA, PENNSYLVANIA.

METER.

SPECIFICATION forming part of Letters Patent No. 777,781, dated December 20, 1904.

Application filed November 1, 1902. Serial No. 129,637.

*To all whom it may concern:*

Be it known that I, AUSTIN FLEEGER, a citizen of the United States, residing at Chicora, in the county of Butler and State of Pennsylvania, have invented certain new and useful Improvements in Meters, of which the following is a specification, reference being had therein to the accompanying drawings.

This invention relates to improvements in meters, and more particularly to gas-meters of what is known as the "wet" type, in which the meter comprises a liquid as an essential part of its operating structure. Such meters are well known and are open to the objection that when the liquid therein falls below a certain level the meter either fails to correctly measure the gas passing through the same or becomes entirely inoperative as a measuring device.

The object of my invention is to overcome this objection; and to these ends my invention consists in certain novel features which I will now proceed to describe and will then particularly point out in the claims.

In the accompanying drawings, Figure 1 is a perspective view of a well-known form of meter having my improvement applied thereto. Fig. 2 is an enlarged detail view of a portion of the same in elevation. Fig. 3 is a sectional view taken on the line $xx$ of Fig. 2 and looking in the direction of the arrows, and Fig. 4 is a detail perspective view in section through the upper cap-plate and the adjacent parts.

In the said drawings the meter as a whole is indicated by the reference-numeral 1, and comprises a body portion having a gas-inlet pipe 2 and gas-outlet pipe 3. The body portion, which contains the liquid and the coöperating mechanical devices, consists of an upper portion 4 and a lower portion 5, the meeting edges of which are provided with flanges 6, united by bolts 7, the two parts of the body being thus rendered separable, so as to give access to the interior of the meter. It is to meters of this type that my invention is more particularly applicable. In the lower portion of the body of the meter is formed a threaded aperture into which is screwed a threaded pipe 8, provided with a shut-off valve or cock 9. To the end of this pipe is secured an elbow 10, having in its upwardly-directed end a socket 11 and provided with lateral lugs 12, having non-circular apertures 13.

14 indicates a glass tube having its lower end seated within the socket 11, the joint between the tube and socket being made tight by a suitable gasket 15 of rubber or the like. The tube 14 is graduated, as indicated at 16, so as to indicate the height of the liquid therein, the liquid in the meter having free access to the tube through the pipe 8 and through a suitable passage 17 in the elbow 10. At its upper end the tube 14 is held in place by a plate 18, having a socket 19, in which the upper end of the tube 14 fits, the joint between the socket and tube being made tight by a suitable gasket 20. The plate 18 is provided with an extension 21, which fits on top of the uppermost flange 6 and which is apertured, as indicated at 22 in dotted lines in Fig. 2, for the passage of one of the bolts 7. The plate 18 is provided with lateral lugs 23, apertured, as indicated at 24, for the passage of connecting-rods 25, which extend up through the lugs 12, said rods having heads 26 below said lugs 12 and non-circular portions 27 fitting the non-circular apertures 13 in said lugs to prevent said rods from turning. The upper ends of the rods 25 pass through the apertures 24 in the lugs 23 and are provided above said lugs with nuts 28. It will be seen that the plate 18 and elbow 10 form caps for the ends of the tube, which caps are drawn toward each other by the connecting-rods, so as to clamp the tube firmly between them, and which caps are supported in position by their connection with the body of the meter, the lower cap by means of the supply-pipe which conducts the liquid to the interior of the tube and the upper cap by the extension thereof bolted to the connecting-flanges of the two parts of the body of the meter.

The plate 18 is provided with a passage $28^a$, communicating with the upper end of the tube 14 and controlled by a valve or cock 29, so that the upper end of said tube may be placed in communication with the atmosphere, when desired, or cut off from such communication at will.

In order that the liquid within the tube 14 shall be subject to the same pressure and therefore stand at the same level as the liquid within the meter, I provide a conduit connecting the upper end of the tube with the space within the meter above the water-line. This conduit is shown in Fig. 4 as comprising a passage 30, extending through the upper cap-plate and its extension and communicating at one end with the upper tube 14 and at the other end with a passage 31, formed through the body of the meter and leading to the space therein above the liquid-level in the meter. The valve 29 serves to close this conduit or open it at will, as clearly shown in Fig. 4.

Where wet meters are employed, it is highly desirable that the condition of the liquid in the meter should be readily ascertainable by the inspector who visits the meter periodically to read the same in order that he may be able to determine whether the meter is in condition to properly register, by reason of the liquid therein being present in sufficient quantity to rise to the proper height. This fact can be readily ascertained by the employment of my improved attachment, since it is only necessary to so turn the valve or cock 9 as to place the tube 14 in communication with the interior of the meter, at the same time opening the valve 29 to permit the air to escape from the upper part of the tube. The liquid will then rise in the tube to a height corresponding to that in the interior of the meter, and an examination of the tube will at once determine whether the meter is in proper condition for correctly measuring the gas which passes through the same. The provision of a valve or cock between the tube and the meter renders it possible to cut off the connection between the tube and the interior of the meter, so as to prevent the escape of the liquid in case the glass is broken or when the meter is refilled with the liquid, and as a matter of precaution this valve may be kept closed, except when the device is being used to ascertain the height of the liquid within the meter. The attachment is of such a character that it may be readily applied to meters already constructed or in use, the lower end being supported by the pipe, which may be readily connected with the body of the meter by tapping said pipe into the same, while the upper end of the device may be supported and held in place by the flanges and connecting-bolts with which the meter is already provided.

I do not wish to be understood as limiting myself to the precise details of construction hereinbefore described, and shown in the accompanying drawings, as it is obvious that these details may be varied without departing from the principle of my invention.

Having thus fully described my invention, what I claim as new, and desire to secure by Letters Patent, is—

1. The combination, with a meter having a two-part body, the meeting edges whereof are provided with flanges and connecting-bolts, of a gage-tube, caps for the upper and lower ends of said gage-tube, an extension from the upper cap secured to the body-flanges by one of the connecting-bolts thereof, and a pipe connected with the lower part of the meter-body and with the lower cap, said cap being provided with a passage connecting said pipe and the gage-tube, and said pipe being connected at its other end with the liquid-receiving space within the meter, substantially as described.

2. The combination, with a meter having a two-part body, the meeting edges whereof are provided with flanges and connecting-bolts, of a gage-tube, caps for the upper and lower ends of said gage-tube, an extension from the upper cap secured to the body-flanges by one of the connecting-bolts thereof, and a pipe connected with the lower part of the meter-body and with the lower cap, said cap being provided with a passage connecting said pipe and the gage-tube, and said pipe being connected at its other end with the liquid-receiving space within the meter, said pipe being provided with a valve, substantially as described.

3. An indicator attachment for wet meters, comprising a gage-tube, a cap-plate fitting the upper end of the gage-tube and adapted for attachment to the meter-body, said cap-plate being provided with an air-outlet and controlling-valve, a cap-plate fitting the lower end of the gage-tube, screw-rods connecting said cap-plates to clamp the gage-tube between them, and a pipe connected to the lower cap-plate, provided with a controlling-valve and adapted to be threaded into the meter-body to connect with the liquid-receiving space therein, substantially as described.

In testimony whereof I affix my signature in presence of two witnesses.

AUSTIN FLEEGER.

Witnesses:
G. D. THOMES,
W. J. CAMPBELL.